Jan. 12, 1937. D. B. PERRY Re. 20,241

PRINTING TELEGRAPH EXCHANGE SYSTEM

Original Filed June 11, 1931 2 Sheets-Sheet 1

INVENTOR
D. B. PERRY
BY
ATTORNEY

Jan. 12, 1937. D. B. PERRY Re. 20,241

PRINTING TELEGRAPH EXCHANGE SYSTEM

Original Filed June 11, 1931 2 Sheets-Sheet 2

INVENTOR
D. B. PERRY
BY
G. E. Hope
ATTORNEY

Reissued Jan. 12, 1937 Re. 20,241

UNITED STATES PATENT OFFICE 20,241

PRINTING TELEGRAPH EXCHANGE SYSTEM

Donald B. Perry, Maplewood, N. J., assignor to American Telephone and Telegraph Company, a corporation of New York.

Original No. 1,926,172, dated September 12, 1933, Serial No. 543,693, June 11, 1931. Application for reissue February 9, 1934, Serial No. 710,579

19 Claims. (Cl. 178—4.1)

Figure 1:
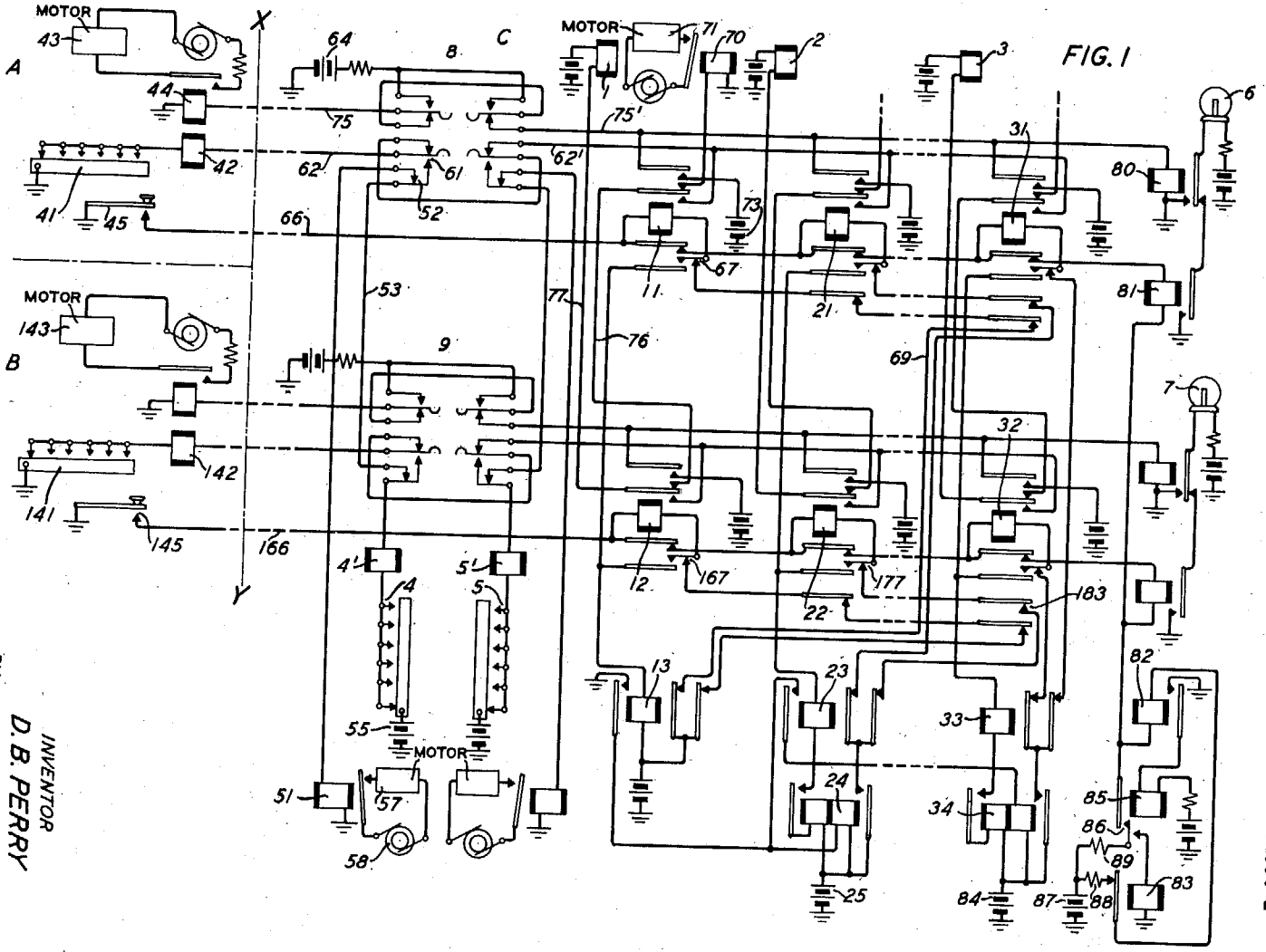

This invention relates to a switching arrangement for connecting together signaling devices such as printing telegraph apparatus. The general object of this invention is to provide a radially-extending transmission system which includes a central station, a number of outlying stations, and switching arrangements whereby any outlying station may transmit to or receive from the central station.

More specifically, an object of this invention is to provide a radial printing telegraph system of the type described above, in which messages may be received at the central office or at an outlying station in the absence of an attending operator.

The present invention is intended for use by commercial establishments and police departments which have a central bureau of intelligence and a number of offices distributed at surrounding points. In such systems the outlying stations communicate frequently with the central office but seldom with each other. Transmission between the respective outlying stations and the central office occurs at irregular intervals. Consequently, the outlying station or the central office may be unattended at the time a message is received and it is necessary that some record be made of the message.

Another object of this invention is to provide a printing telegraph system in which a calling party may control the starting and stopping of the printer motor at the station to which he is transmitting. A further object of this invention is to provide, in a signaling system, an arrangement for connecting a calling party to an idle receiving device. A still further object of this invention is to provide, in a system of the character described, an over-flow signal which becomes operative whenever an incoming call cannot find an idle receiving device, whereby an attendant may establish a connection between the incoming call and an additional receiving device. Still another object of the present invention is to simplify apparatus for routing an incoming call to an idle circuit.

Particular embodiments of the invention include a central office which is provided with a number of receiving printers adapted to be connected to a greater number of outlying stations. Associated with each receiving printer is a group of relays or a selecting device, according to alternative embodiments of the invention. After a particular group or device has been actuated by an incoming call, it conditions the succeeding group or device for establishing a connection with the next station to call.

The central office may also be provided with one or more transmitting devices, by means of which the central office may send messages to any one of the outlying stations. A feature of the present invention is a signaling device to inform the operator that a message is being received from a particular station so that the operator does not attempt to transmit over the same line. The outlying station may receive messages without an attending operator, due to remote control arrangements for starting and stopping the printer motor.

Figure 2:
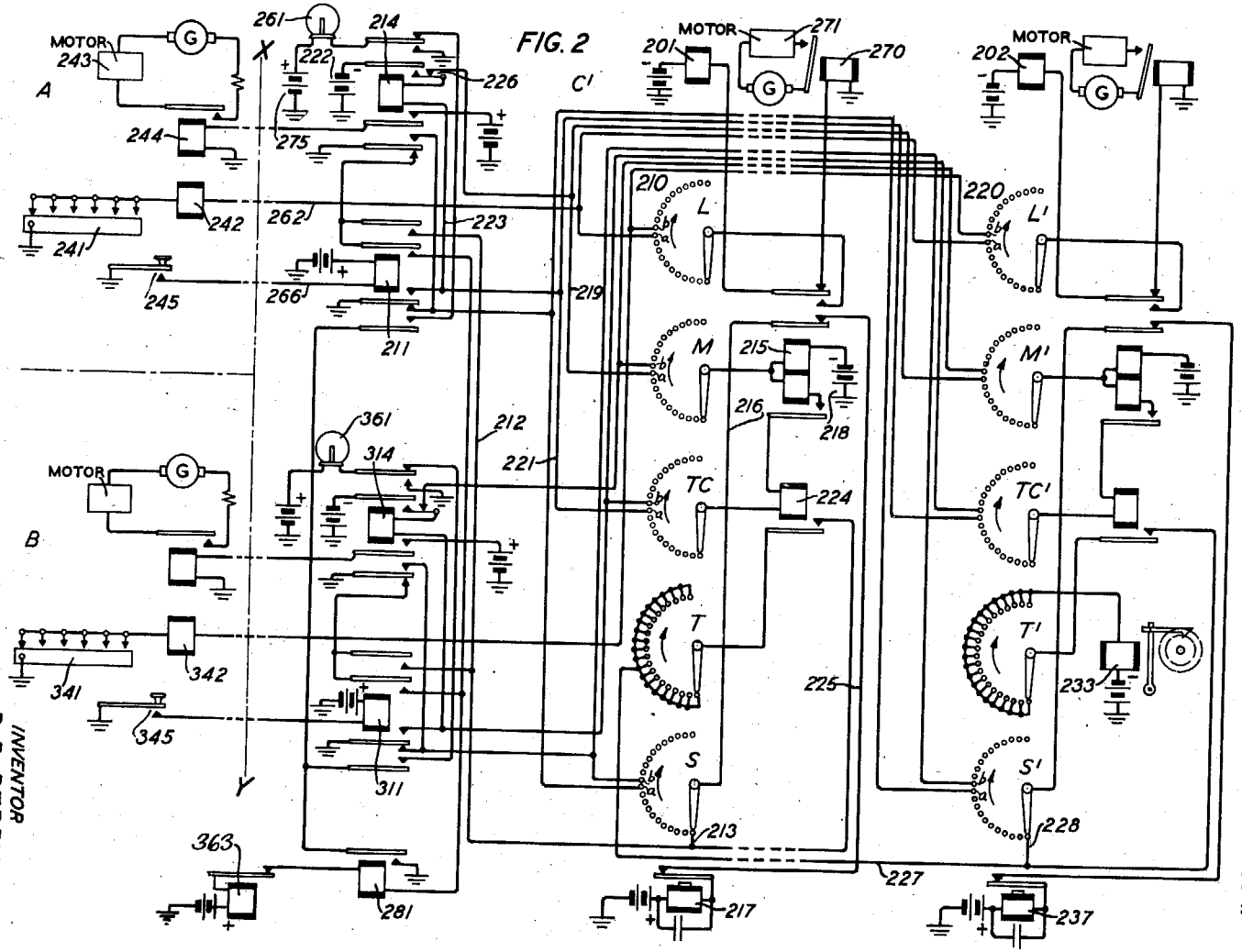

Figure 1 of the accompanying drawings illustrates one embodiment of the present invention, and Fig. 2 is a modification thereof.

*Description of apparatus—Fig. 1*

In the form of invention disclosed in Fig. 1, the apparatus shown to the right of the line XY is situated at the central office C. The central office is connected to two or more outlying stations A and B, each of which outlying stations is provided with a sending printer 41, receiving printer 42, motor 43, motor control relay 44 and key 45, by means of which the outlying station may establish a connection with the central office C.

The central office is provided with three receiving printers of which the line relays 1, 2 and 3 respectively only are shown; two sending printers 4 and 5 with associated receiving equipment 4', 5'; and a number of busy lamps 6 and 7 corresponding to the outlying stations A and B. Included also in the central office equipment are several groups of relays, the first group comprising relays 11, 12 and 13 associated with receiving printer No. 1, the second group comprising relays 21, 22, 23 and 24 associated with receiving printer No. 2, and the third group comprising relays 31, 32, 33 and 34 associated with receiving printer No. 3. The central office is also provided with a switch key 8 by means of which the station A may be connected to either one of the printers 4, 4' or 5, 5', and a similar switching key 9 by means of which the station B may be connected to either one of these printers.

*Outgoing service*

When the attendant at the central office desires to transmit to one of the outlying stations, he operates the key 8 or 9 which corresponds to the desired station, the operation of the key being either to the left or to the right, depending upon whether the sending printer 4 or the printer 5 is used. Assume that the operator desires to transmit to station A by means of the sending printer 4. The key 8 is operated to the left. The operation of key 8 breaks a circuit which formerly extended from ground through motor control relay 51, normally operated contact 52 of key 8, conductor 53, sending printer 4 and positive battery 55. The breaking of the latter circuit releases the armature of relay 51, thereby connecting the motor 57 to a generator 58 or other source of current. The motor commences to rotate and continues rotating until the relay 51 is reenergized by restoration of the key 8 to its normal position.

Simultaneously with the starting of motor 57, the sending printer 4 is connected in a series circuit with the sending and receiving printers of the outlying station A. The latter circuit may be traced as follows: Positive battery 55, sending printer 4, conductor 53, normally non-operated contact 61 of key 8, transmission line 62, receiving printer 42, sending printer 41 and ground. The closing of the uppermost contacts on the left side of key 8 closes a circuit for energizing the motor control relay 44 at station A by the battery 64 at station C. The energization of relay 44 closes a circuit for starting the motor 43. The operator, by using the sending printer 4, may then transmit in the usual manner to the receiving printer 42 at the outlying station A.

When the operator has finished transmitting she merely restores key 8 to normal thereby de-energizing motor control relay 44 and reenergizing motor control relay 51 for stopping the outlying and the local motor, respectively. Thus, transmission from the central office to the outlying station may be made effectively without the need of an attendant at the outlying station for starting the motor or making any other connections.

*Distribution of incoming calls*

At the central office C incoming calls will be diverted automatically to an idle one of the receiving printers 1, 2 and 3. An idle receiving printer may be selected and operated by the calling station A or B without the aid of any operator at station C. Assume that a person at station A desires to transmit a message to any idle one of the receiving printers 1, 2 and 3 at station C. The person at station A depresses the key 45 which closes a circuit for energizing one of the relays 11, 21 or 31, whichever happens to be the first one in the order mentioned which is associated with an idle printer. In case printer 1 is idle, the relay 11 of the first group will be energized in a circuit traced as follows: Key 45, conductor 66, winding of relay 11, normally closed contacts 67 of relay 11, lowermost armatures and contacts of relays 21 and 31, respectively, conductor 69, inner right-hand armature of relay 13 and battery.

The above described circuit through relay 11 could not have been closed had the relay 13 been energized prior to the closing of the key 45. The purpose of connecting relay 11 in a circuit with a break contact of relay 13 is to ensure that relay 11 will not operate while its associated printer 1 is being used by a different calling station, as will be explained more fully.

The energizing of relay 11 energizes relay 13 in a circuit including the lowermost armature and winding of relay 11, conductor 66 and key 45. The left-hand armature of relay 13 closes a circuit for operating relay 24 which connects battery 25 to the right-hand armatures of relay 23.

The inner upper armature of relay 11 in operating breaks a circuit normally connecting printer 1 and its associated motor control relay 70 in series. The breaking of this circuit releases the armature of the motor control relay 70 thereby starting the motor 71 for driving the receiving printer 1. The uppermost armature of relay 11 functions to start the motor at the calling station A by connecting the battery 73 through the key 8 and conductors 75 and 75' to the motor control relay 44. Relay 80 is operated from the same battery and lights the busy lamp 6 associated with station A.

Simultaneously with the starting of the motors at the calling and called stations relay 11 also serves to establish a connection between the sending and receiving printers 41 and 42 at station A and the printer 1 at station C. The connection between these printers may be traced in the following circuit: Ground, sending printer 41 and receiving printer 42 at station A, transmission line 62, normally operated contacts of key 8, conductor 62', make contact and inner upper armature of relay 11, conductor 76, break contact and inner upper armature of relay 12, conductor 77, receiving printer 1 and battery. The calling party at station A is automatically informed of the establishment of connection between the two printers by the starting of motor 43. Having observed the rotation of this motor, the calling party types his message on the sending printer 41 in the usual manner.

The connection between the calling and the called printers will be established as long as the key 45 remains depressed. When the key 45 is released, the circuit is broken through relay 11 which in turn releases relay 13, energizes relay 70 for stopping the motor 71, and disconnects battery from the motor control relay 44 thereby stopping the motor 43 at station A.

*Selecting the second printer*

Assume that while station A is transmitting to the receiving printer 1, an incoming call is received from station B. This call will be diverted to the receiving printer 2 in the following manner:

When the key 145 at station B is depressed, relay 12 associated with printer 1 at the central office cannot be energized, because the circuit extending through the winding and contacts 167 of relay 12 is broken at the right-hand armature of relay 13. Relay 12 therefore remains unoperated and the conductor 166 remains connected to the winding of relay 22. Due to the energization of relay 13 and consequently of relay 24, battery is supplied to the right-hand armatures of relay 23. The relay 22 is therefore energized in a circuit traced as follows: Ground, key 145, calling line 166, inner lower armature and contact of relay 12, winding and normally unoperated contacts 177 of relay 22, armature 183 of relay 32 right-hand armature of relay 23 and of relay 24 and battery 25. The operation of relay 22 performs functions similar to those performed by the operation of relay 11 as before described. Relay 22 in energizing, starts the motor 143 and the motor (not shown) for receiving printer 2. Relay 22 also connects calling printer 141, 142 with printer 2; energizes relay 23 to prevent any further connections to printer 2; lights the busy lamp 7; and disconnects the conductor 166 from the winding of relay 32. The manner in which the foregoing operations are performed will be understood by a comparison with the above described operations performed by the relay 11.

It will be remembered that none of the second group of relays was affected by the incoming call from station A when the first group and printer 1 were not in use. The reason is that a circuit could not be closed through the winding of relay 21 and an armature of relay 23 because the latter was disconnected from the battery 25. The battery connection was established after printer 1 became busy and the relay 13 energized.

Assume that station A is connected to printer 1, station B to printer 2 and that station A disconnects. The connection between station B through the second group of relays to printer 2 is not affected by the circumstance that the first group has become idle. Although relay 13 deenergizes, relay 24 remains locked by a circuit extending through its left-hand winding, the windings of relays 23 and 22, and conductor 166. On the other hand, relay 12 is prevented from reenergizing because the circuit through the winding of that relay and contact 167 is broken at the lowermost armature of relay 22.

*Overflow signal*

Assume that station A calls at a time when all of the printers 1, 2 and 3 are busy receiving messages from station B and similar station. An arrangement is provided, by means of which the lamp 6 associated with station A will flash on and off to notify an attendant operator of the uncompleted call. When the key 45 at station A is depressed, none of the relays 11, 21 or 31 can be energized, and consequently line 66 will be connected in a closed circuit to energize relays 81 and 82. The closed circuit is traced from ground, through key 45, conductor 66, inner lower armatures and contacts of relays 11, 21 and 31, windings of relays 81 and 82, and armature of relay 83 to battery 87. Relay 82 energizes, closing a circuit through the winding of relay 85, which in turn operates and establishes a circuit through the winding of relay 83.

The latter breaks the circuit through the winding of relay 82 causing its release. The release of this relay is effective to release relay 85 and consequently relay 83. The circuit through the windings of relay 82 is then reestablished and another cycle of operations is commenced. This cycle of operation causes the circuit through relay 81 to be completed to battery 87 through resistance 88 at one time and resistance 89 at another time and in the latter case relay 81 is shunted by relay 83. Resistance 89 is much higher than resistance 88 and its value is so chosen that relay 81 will release and reoperate once each cycle of operation of 82, 83, 85.

The alternate opening and closing of the circuit through the winding of relay 81 is effective to cause the lamp 6 to flash on and off. The attendant operator at the central office C is thereby apprized of the circumstance that station A—which corresponds to lamp 6—is attempting to connect to a receiving printer, but that all of the receiving printers are busy. The operator may manually connect a spare printer to the transmission line 62. Inasmuch as such connection is established manually, the method of connecting the spare printer will be understood without further description, to those skilled in the art. One method is to employ one of the receiving equipments 4′, 5′ associated with the sending printers 4 or 5 and make connection by means of the key 8.

*Description of apparatus—Fig. 2*

In the modified form of the invention which is illustrated in Fig. 2 there are two outlying stations A and B connected to a central office C′. The apparatus at the outlying stations A and B is similar to the apparatus at the stations A and B in Fig. 1, and is designated by numerals increased in each instance by 200. At the central office C′ there is a receiving printer 201 associated with a bank of selectors 210 and a similar printer 202 associated with a similar bank of selectors 220. Each bank consists of five selectors S, T, TC, M and L. The function of the selector switch S is to control the stepping of the selector switches in the entire bank. The transfer switch T serves to transfer an incoming call from the first bank 210 to the next bank which may be the bank 220 or any intermediate bank. The transfer control switch TC cooperates with the transfer switch T so that the incoming call is connected through the transfer switch T only when the selector switches of the bank 210 have reached a position corresponding to the calling station. The motor control switch M is adapted to start the motor at the calling station upon completion of the connection between the calling station and the receiving printer 201. The selector switch L serves to establish a connection between the printer at the calling station and the receiving printer 201 associated with the bank 210.

*Description of operation—Fig. 2*

The operation of the circuit shown in Fig. 2 will be more clearly understood by assuming that the calling party A desires to transmit to an idle one of the printers 201 and 202. The calling party initiates the call by closing key 245 which establishes a circuit through conductor 266 for energizing relay 211. The operation of relay 211 connects ground through the lowermost armature of relay 214, uppermost armature of relay 211, and conductor 212 to the segment 213 upon which the brush of switch S rests when printer 201 is idle. In this connection it must be borne in mind that the segment 213 can be grounded only when a set of two conditions concur; first, that the relay 211 is energized, and second, that the relay 214 is not energized; or when a similar relationship exists between the relays 311 and 314 corresponding to station B. or between corresponding relays of any other calling station.

The inner lower armature of relay 211 removes ground from the segment *a* of switch S and puts ground on the *a* segment of switch TC. The grounding of segment 213 establishes a circuit for energizing the stepping magnet 217. This circuit may be traced from the grounded contact 213, the brush of selector switch S, conductor 216, inner upper armature of relay 215, conductor 225 and back contact, armature and winding of relay 217 to battery. Stepping relay 217 opens and closes the circuit just mentioned, thereby stepping the selector brushes in unison as long as the brush of the switch S is connected to a segment which is connected to ground. As the brush of switch S passes over the segments associated with different outlying stations the brush may find some segments grounded because the outlying station is idle and the relay which corresponds to relay 211 is not energized. On the other hand the outlying station may be already connected to one of the printers such as printer 202, in which case the segment is grounded for the reason that the relay corresponding to relay 214 is energized as will be described subsequently. When the brush reaches the segment *a* however, this segment is not grounded because the relay 211 is energized and relay 214 is not. Consequently, the circuit through the brush of selector switch S and through the stepping magnet is opened at the selector switch, and the switches in the bank 210 cease stepping. The brushes of all the selector switches are now resting upon their *a* segments. Relay 215 is thereby energized in the following circuit: Battery 218, upper winding of relay 215, brush of selector switch M, *a* segment, conductor 219, break contact 226 of relay 214, winding of relay 214, conductor 223, and make contact and inner lower armature of relay 211 to ground.

Relay 214 is energized, and establishes a locking circuit for itself extending from battery 222, through the inner upper armature and winding of relay 214, conductor 223, make contact and inner lower armature of relay 211 to ground. During the time that relay 214 remains energized, its lowest armature maintains a ground connection to the *a* segments of the switches S and S′, thereby preventing the selector brushes in any bank other than 210 from stopping on the *a* segments.

The circuit which extended through the upper winding of relay 215 is broken at the contact 226, but before this circuit breaks, the lower winding of relay 215 establishes a locking circuit extending from battery 218, through both windings of relay 215 in series, lower armature of relay 215, winding of relay 224, brush of selector switch TC, segment *a*, conductor 221, and inner lower armature of relay 211 to ground. Relay 215 in operating releases motor control relay 270 thereby starting the motor 271, and also connects the receiving printer 201 through the uppermost armature of relay 215 and the brush of selector switch L to the transmission line 262. The calling party at station A may now transmit in the usual manner by means of the transmitter 241 which is connected in a series circuit with the receiving printer 201 at the central office C′.

The energizing of relay 224 connects the brush of the transfer switch T to the segment 213 of selector switch S. All of the off-normal segments of transfer switch T are connected together with a segment 228 situated on one of the selectors in the bank 220, and corresponding in function to the segment 213.

*Selecting the second printer—Fig. 2*

Assume that station B desires to transmit during the time that station A is connected to the receiving printer 201. The switch 345 at station B is depressed thereby operating relay 311. The latter relay connects ground through its uppermost armature and contact to the segment 213 in the bank 210. That segment is now disassociated with the brush S and the grounding of segment 213 does not therefore have any effect upon the operation of the bank of selectors 210. The segment 213 is now connected through the armature of relay 224 and the selector switch T to the segment 228 on the selector switch S′ in the bank 220.

The operation of the bank of selectors 220 is similar to the operation of the bank 210. The *a* and *b* segments for the switch L′ are always connected to corresponding segments of the switch L. The same is true of the corresponding segments on selectors TC and TC′, and S and S′. When the segment 228 is grounded the stepping magnet 237 commences to step the selector brushes in bank 220 in the same manner that the selecting magnet 217 steps the switches of bank 210. Thus, the printer 341—342 at station B is connected through the second bank of selectors 220 to the receiving printer 202 at the main or central station.

If desired a message register 233 may be connected to the selector switch T′ to indicate the number of times that the last bank of selectors 220 operate to connect the last printer 202 to an incoming call. The message register 233 is connected to all segments but one of the switch T′, whereby the register will be operated whenever the selector switches of the bank 220 step from the normal position.

*Calling station A disconnects*

When the party at station A has finished his message, he releases key 245 thereby causing the deenergization of relay 211. The latter in releasing deenergizes relays 224 and 215. The release of relay 215 restores the motor 271 and the printer 201 to their normal conditions and the motor 271 comes to rest. The release of relay 211 also causes the breaking of the circuit extending through relay 214. The latter relay releases, thereby stopping the motor 243 at calling station A. The releasing of relay 211 also restores ground to the contact segment *a* of selector switch S whereupon the stepping magnet 217 is reenergized and commences to step until the selectors in bank 210 have reached their normal position, and the brush of selector S rests upon segment 213.

*Flashing circuit*

An arrangement is provided at the central office C′ whereby an attendant operator may determine which of the calling stations is busy and therefore connected to a receiving motor, and which are unable to secure access to a receiving printer. The arrangement thus provided includes a number of signal lamps 261, 361, etc., associated with the calling stations A and B, respectively. Whenever one of the stations, say station A is connected to any receiving printer at station C′ the relay 214 will be energized, thereby closing a circuit through the signal lamp 261. This circuit causes the lamp to light continuously whereby an operator may be apprized of the fact that station A is connected to one of the receiving printers. In case one of the stations, say station B, attempts unsuccessfully to be connected to one of the receiving printers, then the relay 311 becomes energized while the relay 314 remains unoperated. In such a situation the lamp 361 is connected in a circuit which causes the lamp to flash. Instead of being connected continuously to ground, as in the case of the relay 261, the lamp 361 is connected to the armature of a relay 281 which successively makes and breaks a connection to ground. The connection between the lamp 361 and the armature of relay 281 may be traced from battery, through lamp 361, uppermost armature and break contact of relay 314, make contact of lowermost armature of relay 311, and armature of relay 281 to ground.

The winding of relay 281 is connected in a circuit which closes through relays 311 and 314 to ground, whenever relay 311 is energized and relay 314 not energized. The connection may be traced from the winding of relay 281 through the upper inner armature of relay 311 and lowermost armature of relay 314 to ground. Connected in the same circuit is an interrupting device 363 for causing the circuit through relay 281 to be opened and closed automatically.

The relay 281 is similarly adapted to be connected through the relays 211 and 214 to the lamp 261, for flashing the lamp 261 whenever the station A makes an uncompleted call.

In the circuit of Fig. 2, there may be other outlying stations in addition to stations A and B. Similarly there may be other banks of selectors intermediate banks 210 and 220.

Keys and printers may be provided to give outgoing service by the same means 4, 4', 5, 5' as shown in Fig. 1.

What is claimed is:

1. A signaling system comprising a sending station, a plurality of receiving stations each provided with a signal recording device and a motor, selecting means for automatically establishing in one operation a connection between the sending station and an idle one of said receiving station whenever any one of said receiving stations is idle, characterized by means at the sending station for controlling the starting and the stopping of the motor at the connected receiving station.

2. In a signaling system, a signal sending station, a plurality of signal recording stations, automatic switching apparatus adapted to connect the sending station to any one of the recording stations, a line extending from the sending station to the switching apparatus and being normally open, and means for closing said line, characterized in this that the switching apparatus is responsive to the closing of said line to select an idle one of said recording stations.

3. In a printing telegraph system, a central office having a plurality of receivers, a plurality of outlying stations each connected to the central office by a transmission line and a calling line, said transmission line being open-circuited at the central office and the calling line being open-circuited at the outlying station when the latter is not in use, and means responsive to the closing of the calling line to connect the transmission line to an idle printer.

4. In a printing telegraph system, a central office having a plurality of receiving printers, a plurality of outlying stations each connected to the central office by a transmission line and a calling line, said central office being provided with a plurality of selecting devices, one device associated with each receiving printer, said transmission line being normally open-circuited at the central office, and the calling line being normally open-circuited at the outlying station when the latter is not in use, and said selecting devices being responsive to the closing of the calling line to connect the transmission line to an idle printer.

5. A printing telegraph system as defined in claim 4 in which each selecting device, during the time its associated printer is busy, closes a circuit for preparing the next idle selecting device to receive a succeeding call from another outlying station.

6. In a printing telegraph system, an idle printer finder comprising a central office, a plurality of outlying stations each connected to the central office by a line which is normally open-circuited at the central office, said central office having a plurality of printers, a group of relays associated with each of said printers, each group of relays having means for establishing a connection between any one of said lines and the printer associated with the group, and switching means at each outlying station for operating an idle one of said groups to establish such connection.

7. In a printing telegraph system, a central office having a plurality of receiving printers, a motor and a selecting device associated with each one of said receiving printers, a plurality of outlying stations each connected to the central office by a transmission line and a calling line, said calling line being open-circuited at the outlying station and the transmission line being open-circuited at the central office when the outlying station is not in use, said selecting devices being responsive to the closing of the calling line to connect the transmission line to an idle one of said printers, and having means for starting the motor for the receiving printer when the latter is connected to one of the transmission lines.

8. A printing telegraph system as defined in claim 7 in which each outlying station is provided with a motor which is started by means common to the means for starting the motor for the receiving printer.

9. In a printing telegraph system, a central office having a plurality of receiving printers, a plurality of outlying stations each connected to the central office by a transmission line, the transmission line being normally open-circuited at the central office, said central office having a bank of selector switches associated with each receiving printer, one selector switch being adapted to connecting transmission line with the associated receiving printer, the establishment of such connection being under the control of the calling outlying station, and another selector switch being adapted to prepare the next idle selector bank to connect its associated receiving center with the next calling outlying station.

10. A printing telegraph system as defined in claim 9 which includes further a message register and means for energizing the message register each time that all banks of selector switches and all receiving printers are in use.

11. In a printing telegraph system, a central office having a plurality of receiving printers, a plurality of outlying stations, each provided with a printer and a motor therefor, the printer being connected to the central office by a transmission line, the central office having a pair of relays associated with each outlying station and having also selecting apparatus, the first relay of each pair being operable under the control of a calling outlying station and adapted to cause the selecting apparatus to establish a connection between the calling station and an idle one of said receiving printers, and the second relay of each pair being responsive to the establishment of such a connection to start the motor at the calling station.

12. A printing telegraph system as defined in claim 11 which comprises a busy signal lamp adapted to be energized in response to the operation of the second relay of a pair of relays associated with the signal lamp.

13. In a printing telegraph system as defined in claim 11, a flashing circuit for indicating an unsuccessful call, said flashing circuit being adapted to cause an intermittent current to flow through the lamp, and said flashing circuit being adapted to be closed when the first relay of a pair of relays is operated and the second relay is non-operated.

14. A telegraph signaling system comprising a plurality of outlying calling stations each provided with a transmitter and a motor therefor, a central station comprising a plurality of receivers separated from the calling station, a circuit changing device at said calling station, means at said central station operative under the influence of said device upon a calling actuation thereof being made for selecting an idle one of said receivers and connecting it to the transmitter of said calling outlying station in signal transmitting relation whenever any of said receivers is idle, and means also operative under the influence of said device for disconnecting said selected receiver without disturbing the condition of operation of other of said receivers.

15. A system in accordance with claim 14 wherein a single operation of said circuit changing device sets into operation means for selecting an idle one of said receivers and a single operation restores the selected receiver to the non-signaling condition.

16. In a telegraph system, a central station having a plurality of transmitters and a plurality of receivers, a plurality of outlying stations, lines associated with said outlying stations and terminating at said central station, means whereby an operator at the central station may select and connect a central station transmitter to any desired idle outlying station receiver and may start the motors of both said transmitter and said receiver and may thereafter stop both said motors, and means whereby an operator at an outlying station may connect his local station transmitter to one of the central station receivers whenever any of said receivers is idle and may start the motors of both the transmitter and the receiver which he has connected.

17. In combination, a plurality of outlying telegraph stations each equipped with telegraph transmitting and receiving apparatus, a central station having association therewith, a plurality of receiving printers and transmitting devices, means whereby an operator at an outlying station may connect his transmitter to one of the receiving printers at the central station if any of said receiving printers be idle and may cause both his own transmitter motor and the motor of said connected receiving printer to start, means for causing both said motors to stop whenever said operator disconnects his transmitter, means whereby an operator at said central station may connect a transmitter at the central station to the receiver of any desired outlying station which is idle and may start the motor of his central station transmitter and that of the receiver at the outlying station to which the transmitter is connected, and means for stopping said two last-mentioned motors when the central station operator disconnects the transmitter from the outlying receiver.

18. In combination, a telegraph station having a transmitting device and a telegraph receiving printer, a line terminating at said station, a plurality of other telegraph stations each equipped with printing telegraph transmitters and printing telegraph receivers associated with said line, said other stations being remote from said first-mentioned station, means whereby an operator at any of said other stations may start and stop the motor of his own station, and that of said first-mentioned station when said first-mentioned station is otherwise idle and may transmit telegraph messages from his local printer to the receiver of said first-mentioned station, and means whereby an operator at said first-mentioned station may cause the starting of his own motor and that of an idle one of said other stations in one operation if any of said other stations be idle, may transmit a message from his local transmitter to the receiver of said connected other station and may stop the motors at both said stations at the conclusion of said message.

19. A telegraph signaling system comprising a plurality of outlying stations each station being provided with telegraphic instrumentalities operated by a motor, a central station comprising a plurality of receivers connectible with said instrumentalities over circuits, selecting means controllable from any one of said outlying stations for selecting an idle one of said receivers whenever any of said receivers is idle and establishing a connection therebetween and said instrumentalities, means responsive to the establishment of said connection for starting the motor at the station, and means wherein a line circuit extending through said instrumentalities and to at least one of said receivers is normally open when idle.

DONALD B. PERRY.